United States Patent
Kou et al.

(10) Patent No.: US 12,420,613 B2
(45) Date of Patent: Sep. 23, 2025

(54) METHOD FOR CONTROLLING VEHICLE AIR CONDITIONER AND VEHICLE ON-BOARD CONTROLLER

(71) Applicant: HUIZHOU ROYPOW TECHNOLOGY CO., LTD, Huizhou (CN)

(72) Inventors: Fangzheng Kou, Huizhou (CN); Yanshen Hu, Huizhou (CN)

(73) Assignee: HUIZHOU ROYPOW TECHNOLOGY CO., LTD, Huizhou (CN)

( * ) Notice: Subject to any disclaimer, the term of this patent is extended or adjusted under 35 U.S.C. 154(b) by 173 days.

(21) Appl. No.: 18/094,711

(22) Filed: Jan. 9, 2023

(65) Prior Publication Data
US 2024/0066946 A1 Feb. 29, 2024

(30) Foreign Application Priority Data
Aug. 25, 2022 (CN) .......................... 202211025718.7

(51) Int. Cl.
  *B60H 1/00* (2006.01)
(52) U.S. Cl.
  CPC ....... *B60H 1/00657* (2013.01); *B60H 1/0073* (2019.05); *B60H 1/00735* (2013.01); *B60H 2001/00733* (2019.05)
(58) Field of Classification Search
  CPC .................. B60H 1/00657; B60H 1/0073
  See application file for complete search history.

(56) References Cited

U.S. PATENT DOCUMENTS

| 11,613,232 B2* | 3/2023 | Hoshino ................ B60S 1/026 |
| | | 219/203 |
| 2018/0222281 A1* | 8/2018 | Tamane ................ G07C 5/008 |
| 2019/0030987 A1 | 1/2019 | Li |
| 2020/0223284 A1* | 7/2020 | Hoshino .............. B60H 1/0073 |
| 2020/0276878 A1 | 9/2020 | Zhang et al. |
| 2020/0355151 A1* | 11/2020 | Chaya ..................... B60S 1/023 |
| 2021/0344060 A1* | 11/2021 | Charoulet ............ B60H 1/3232 |

FOREIGN PATENT DOCUMENTS

| CN | 109249878 A | 1/2019 |
| CN | 111890873 A | 11/2020 |
| CN | 112477547 A | 3/2021 |
| DE | 102020118036 A1 | 1/2022 |
| GB | 2592215 A | 8/2021 |
| WO | 2021244536 A1 | 12/2021 |

OTHER PUBLICATIONS

Chinese Patent Office: Office Action of CN 202211025718.7 (related application); Jan. 13, 2023; 11 pages.

* cited by examiner

*Primary Examiner* — Nelson J Nieves (57) ABSTRACT

The present disclosure relates to a method and device for controlling vehicle air conditioner, and a vehicle on-board controller. The vehicle on-board controller acquires the target command, the target command is generated and sent by the terminal at the target time according to the target pre-control strategy. The target pre-control strategy is generated according to the key data and confirmed by the user. Therefore, the vehicle on-board controller can control the vehicle on-board battery to provide the target input power for the vehicle air conditioner within the preset length of time according to the target command, so that the vehicle air conditioner may precool or preheat for the preset length of time from the target time.

11 Claims, 5 Drawing Sheets

METHOD FOR CONTROLLING VEHICLE AIR CONDITIONER AND VEHICLE ON-BOARD CONTROLLER

CROSS-REFERENCE TO RELATED APPLICATIONS

This application claims priority to Chinese patent application No. 2022110257187 filed with the Chinese Patent Office on Aug. 25, 2022, entitled "METHOD AND DEVICE FOR CONTROLLING VEHICLE AIR CONDITIONER AND VEHICLE ON-BOARD CONTROLLER", the entire content of which is incorporated by reference.

TECHNICAL FIELD

This disclosure relates to the vehicle air conditioner control technologies, and in particular, to a method for controlling vehicle air conditioner, and a vehicle on-board controller.

BACKGROUND

At present, an air conditioner on a truck is generally driven by an engine of the truck. A compressor is driven by a belt to realize a refrigeration function of the air conditioner. The degree of refrigeration is directly related to the engine speed. A user must start a vehicle for refrigeration, and it takes a while to adjust the temperature inside the vehicle, resulting in poor user experience.

SUMMARY

In order to solve the above-mentioned problems, the present disclosure provides a method and device for controlling vehicle air conditioner, and a vehicle on-board controller capable of remotely controlling the vehicle air conditioner for precooling and preheating.

In a first aspect, the present disclosure provides a method for controlling vehicle air conditioner applied in a vehicle on-board controller, the method includes: acquiring a target command sent by a terminal, the target command being generated and sent by the terminal at a target time according to a target pre-control strategy, and the target pre-control strategy being generated according to key data and confirmed by a user; and controlling a vehicle on-board battery, according to the target command, to provide a target input power for a vehicle air conditioner within a preset length of time to control the vehicle air conditioner to precool or preheat for the preset length of time from the target time.

In an embodiment, the key data includes usage data of the vehicle air conditioner, the method further includes: acquiring and sending the usage data of the vehicle air conditioner to the terminal to enable the terminal to generate the target pre-control strategy according to the usage data of the vehicle air conditioner.

In an embodiment, the target command includes a precooling command and a preheating command, the precooling command is generated when the vehicle air conditioner is needed to perform precooling, and the preheating command is generated when the vehicle air conditioner is needed to perform preheating In a second aspect, the present disclosure provides a method for controlling vehicle air conditioner applied in a terminal, the method includes: acquiring key data sent by a vehicle on-board controller; generating a target pre-control strategy according to the key data; displaying the target pre-control strategy by a display interface of the terminal; and generating a target command and sending the target command to the vehicle on-board controller at a target time according to the target pre-control strategy, in response to a confirmation operation for the target pre-control strategy on the display interface.

In an embodiment, the after the displaying the target pre-control strategy by a display interface of the terminal, the method further includes: generating the target command and sending the target command to the vehicle on-board controller at the target time according to an adjusted target pre-control strategy, in response to an adjustment operation for the target pre-control strategy on the display interface.

In an embodiment, the key data includes: user information, historical usage data of a vehicle air conditioner, and weather information.

In an embodiment, the generating the target pre-control strategy according to the key data includes: acquiring key data sample sets, the key data sample sets comprising user information, historical usage data of a vehicle air conditioners, and historical weather information; inputting data in the key data sample sets into a preset neural network model to train the preset neural network model; using the neural network model as a control strategy generation model; and generating the target pre-control strategy according to current weather information, user information of a user currently logged in, and the control strategy generation model.

In an embodiment, the inputting data in the key data sample sets into a preset neural network model to train the preset neural network model includes: inputting the user information and the historical weather data during a historical use of the vehicle air conditioner into the preset neural network model to obtain a predicted usage data of the vehicle air conditioner; and updating weight parameters of the preset neural network model according to an error between the predicted usage data of the vehicle air conditioner and a corresponding actual historical usage data of the vehicle air conditioner, until the error between the predicted usage data of the vehicle air conditioner and the corresponding actual historical usage data of the vehicle air conditioner is less than a preset threshold.

In an embodiment, the target command comprises a precooling command and a preheating command, the precooling command is generated when the vehicle air conditioner is needed to perform precooling, and the preheating command is generated when the vehicle air conditioner is needed to perform preheating.

In a third aspect, the present disclosure provides a vehicle on-board controller, comprising a memory and a processor, a computer program is stored in the memory, and when the computer program is executed by the processor, the vehicle on-board controller performs the following steps: acquiring a target command sent by a terminal, the target command being generated and sent by the terminal at a target time according to a target pre-control strategy, and the target pre-control strategy being generated according to key data and confirmed by a user; and controlling a vehicle on-board battery, according to the target command, to provide a target input power for a vehicle air conditioner within a preset length of time to control the vehicle air conditioner to precool or preheat for the preset length of time from the target time.

DETAILED DESCRIPTION

In order to make the purpose, technical solutions and advantages of the present disclosure more clear, the present disclosure will be further described in detail below with reference to the accompanying drawings and embodiments. It should be understood that the specific embodiments described herein are only used to explain the present disclosure, but not to limit the present disclosure.

Figure 1:
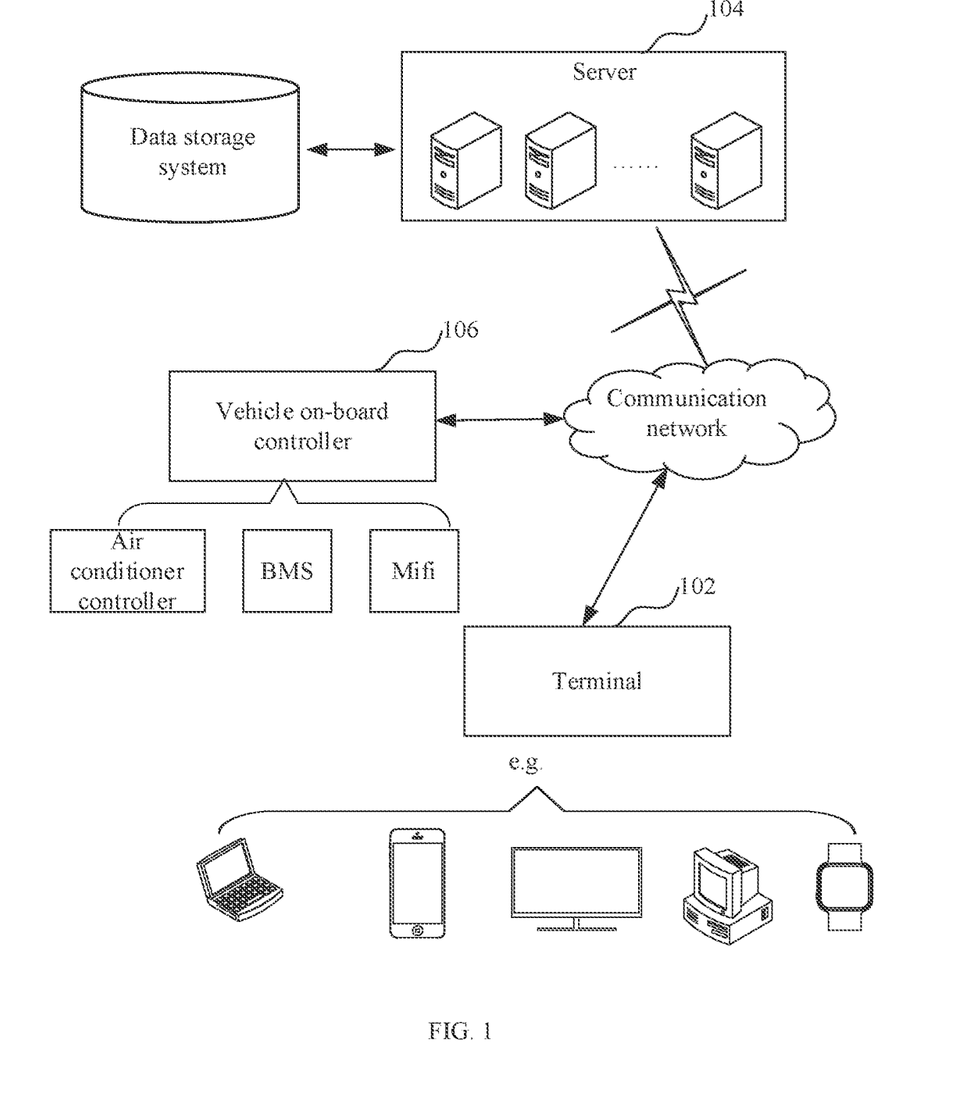
FIG. 1 is a diagram showing an application environment of a method for controlling a vehicle air conditioner according to an embodiment.

In an embodiment, a method for controlling vehicle air conditioner provided by the present disclosure may be applied in an application environment as shown in FIG. 1. A terminal 102 communicates with a server 104 through a network. The server 104 communicates with a vehicle on-board controller 106 through the network. A data storage system may store data that needs to be processed by the server 104. The data storage system may be integrated on the server 104, or arranged on a cloud server or other network servers. The vehicle on-board controller 106 acquires usage data of the vehicle air conditioner during the operation of the vehicle air conditioner, and transmits the usage data to the terminal 102 through the server 104. The terminal 102 obtains a control strategy generation model for subsequent use by machine training according to the usage data of the vehicle air conditioner, current user information and weather information. When a user logs into the terminal 102, the current user information and the current weather data may be used as an input of the control strategy generation model, and a target pre-control strategy is obtained and displayed. If the user performs a confirmation operation, a target command is generated and sent to the vehicle on-board controller 106 at a target time according to the target pre-control strategy. In some embodiments, the target command includes a precooling command and a preheating command. The precooling command is generated when the vehicle air conditioner is needed to perform precooling, and the preheating command is generated when the vehicle air conditioner is needed to perform preheating. The vehicle on-board controller 106, in response to the target command, controls a vehicle on-board battery to supply power to the vehicle air conditioner with a target input power, so that the vehicle air conditioner is turned on at the target time to start precooling or preheating for a preset length of time. When the user enters a cabin of the vehicle, a temperature inside the cabin already meets the user's expectation. The terminal 102 may be, but is not limited to, a personal computer, a laptop, a smart phone, a tablet computer, an Internet of Things (IoT) device, or a portable wearable device. The IoT device may be a smart speaker, a smart TV, a smart air conditioner, or the like. The portable wearable device may be a smart watch, a smart bracelet, a head wear device, or the like. The server 104 may be an independent server or a server cluster composed of multiple servers.

Figure 2:
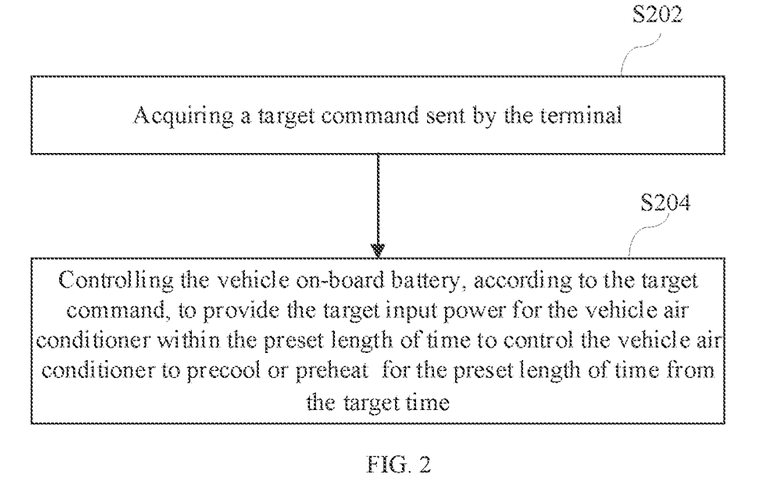
FIG. 2 is a schematic flowchart of a method for controlling a vehicle air conditioner according to an embodiment.

In an embodiment, as shown in FIG. 2, a method for controlling vehicle air conditioner is provided. Taking the method applied to the vehicle on-board controller 106 in FIG. 1 as an example, the method includes the following steps S202 and S204.

At step S202, a target command sent by the terminal is obtained. The target command is generated and sent by the terminal at the target time according to the target pre-control strategy, and the target pre-control strategy is generated according to key data and confirmed by the user. In some embodiments, the target command includes the precooling command and the preheating command. The precooling command is generated when the vehicle air conditioner is needed to perform precooling, and the preheating command is generated when the vehicle air conditioner is needed to perform preheating. The key data refers to the data that may represent the user's habit of using the vehicle air conditioner. For example, the key data may include user information, weather information (season, temperature, whether it rains, etc.), and historical usage data of the vehicle air conditioner. The target pre-control strategy is a vehicle air conditioner control strategy that meets the user's expectations. The pre-control strategy includes, for example, the time the user wants the vehicle air conditioner to start (the target time), the mode the user wants the vehicle air conditioner to operate in (precooling or preheating), the power the user wants the vehicle air conditioner to operate at (related to the target input power provided by the vehicle on-board battery), and the time length the users wants the vehicle air conditioner to operate for (the preset length of time), such that the temperature inside the vehicle (the target temperature) meets the user's expectations.

At step S204, the vehicle on-board battery is controlled, according to the target command, to provide the target input power for the vehicle air conditioner within the preset length of time to control the vehicle air conditioner to precool or preheat for the preset length of time from the target time. The target command may be transmitted to the vehicle on-board controller by the server 104.

In detail, the vehicle on-board controller obtains the target command sent by the terminal. The target command are instructions generated and sent by the terminal at the target time according to the target pre-control strategy. The target pre-control strategy is a strategy generated according to the key data and confirmed by the user. Therefore, the vehicle on-board controller can control the vehicle on-board battery to provide the target input power for the vehicle air conditioner within the preset length of time according to the target command, so that the vehicle air conditioner may precool or preheat for the preset length of time from the target time. The precooling control and the preheating control of the vehicle air conditioner is realized by means of a feature that the vehicle on-board battery, such as an on-board lithium battery, can supply power to the vehicle air conditioner when the engine stops. The target pre-control strategy is generated according to the key data that can represent the user's habit of using the vehicle air conditioner, so that the target command generated according to the target pre-control strategy can instruct the vehicle on-board controller to control the vehicle air conditioner to work in a state required by the user. Before the user enters the vehicle, the temperature in the vehicle has been adjusted to the user's desired status, which is beneficial to improve the user experience.

Figure 3:
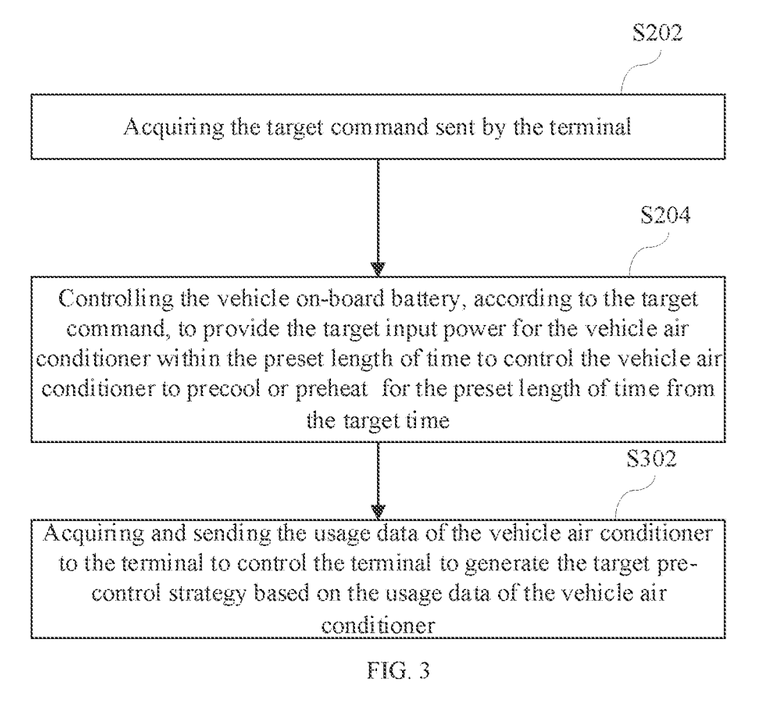
FIG. 3 is a schematic flowchart of a method for controlling a vehicle air conditioner according to another embodiment.

In an embodiment, the key data includes the usage data of the vehicle air conditioner, as shown in FIG. 3, the method further includes the following step S302.

At step S302, the usage data of the vehicle air conditioner is acquired and sent to the terminal to control the terminal to generate the target pre-control strategy according to the usage data of the vehicle air conditioner. The usage data of the vehicle air conditioner may reflect the time when the user uses the vehicle and a commonly used temperature in the vehicle during the usage. The usage data of the vehicle air conditioner may include a single use duration, a start time of use, an end time of use, an operating power, a temperature in the vehicle, and a working mode (including at least the precooling mode and the preheating mode) of the vehicle air conditioner. Sending these usage data to the terminal is convenient for the terminal to update the control strategy generation model, so that the target pre-control strategy that better matches the user's expectations may be generated based on an updated control strategy generation model. Therefore, the vehicle air conditioner may be controlled to precool or preheat the vehicle in advance when the user is about to use the vehicle, which provides the user with a better driving experience.

Figure 4:
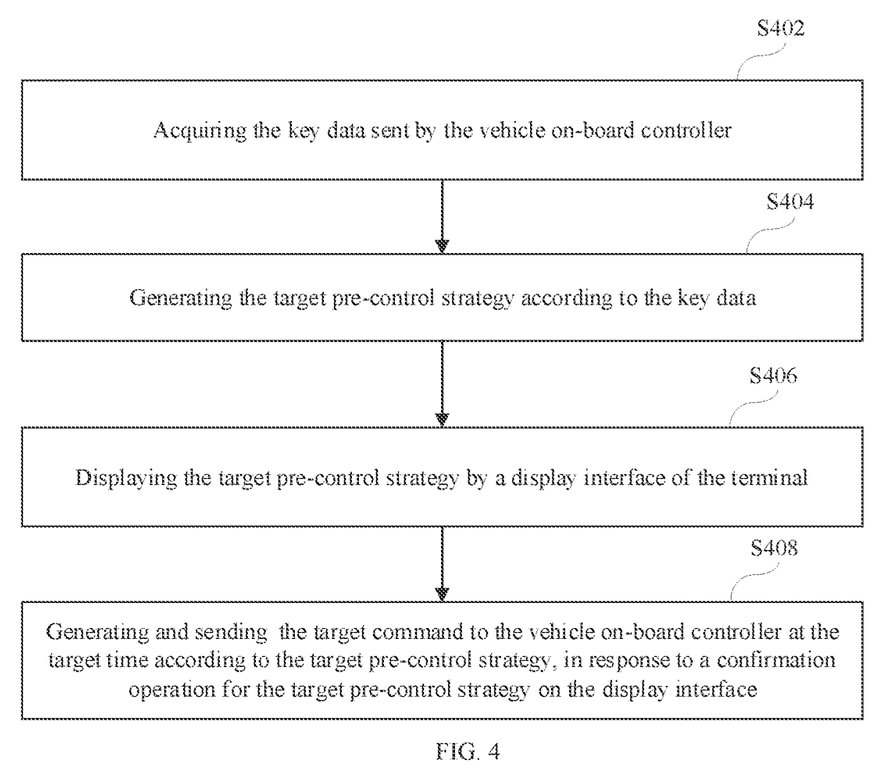
FIG. 4 is a schematic flowchart of a method for controlling a vehicle air conditioner according to another embodiment.

In an embodiment, the present disclosure further provides a method for controlling vehicle air conditioner applied in the terminal as shown in FIG. 1. As shown in FIG. 4, the method includes the following steps.

At step S402, the key data sent by the vehicle on-board controller is acquired. The key data is described in the above embodiments and will not be repeated here.

At step S404, the target pre-control strategy is generated according to the key data. The definition of the target pre-control strategy is described in the above embodiments and will not be repeated here.

At step S406, the target pre-control strategy is displayed by a display interface of the terminal. The form of display may be a pop-up window, a timed push display, etc. For example, a push may be performed in a certain time before the target time, such as five minutes before the target time, so that the user may confirm whether to perform the precooling control or the preheating control according to the target pre-control strategy.

At step S408, in response to a confirmation operation for the target pre-control strategy on the display interface, the target command is generated and sent to the vehicle on-board controller at the target time according to the target pre-control strategy.

The confirmation operation may be an operation action such as checking the target pre-control strategy on the display interface, or clicking a confirmation button next to the target pre-control strategy on the display interface. There are many methods to realize the confirmation operation, and it will not be exhaustive here. After the user performs the confirmation operation on the display interface of the terminal, a backend of the terminal generates and sends the target command to the vehicle on-board controller at the target time according to the target pre-control strategy, so as to control the vehicle on-board controller to perform the above-mentioned method at the vehicle on-board controller side, and the precooling control or the preheating control of the vehicle air conditioner is realized.

In an embodiment, after the step of displaying the target pre-control strategy by the display interface of the terminal, the method further includes the following step: in response to an adjustment operation for the target pre-control strategy on the display interface, the target command is generated and sent to the vehicle on-board controller at the target time according to an adjusted target pre-control strategy.

For example, a target pre-control strategy before adjustment is pushed and displayed five minutes before the target time of the target pre-control strategy before adjustment. In this case, the user may perform the adjustment operation for the target pre-control strategy on the display interface, for example, the operation of modifying the strategy parameters such as the target time, the input power, the preset length of time and an expected temperature in the vehicle. According to the adjustment operation, the original target pre-control strategy is adjusted to form the adjusted target pre-control strategy, and the target command is generated and sent to the vehicle on-board controller according to the adjusted target pre-control strategy at the target time (the target time corresponding to the adjusted target pre-control strategy), so that the temperature inside the vehicle after precooling or preheating better meets the actual needs of the user.

For example, a user A usually delivers goods to a city B at 8:00 AM every morning, and the user A likes to adjust the temperature of the vehicle air conditioner to 21° C. in summer for one hour, which is a total delivery time of the user A. According to the key data of the user A, in summer, the terminal generates a target pre-control strategy for the vehicle corresponding to the user A according to the current weather data of "summer" and the user information of "user A". The target pre-control strategy is to generate and send the precooling command to the vehicle on-board controller at 7:50 AM in the morning, and the vehicle on-board controller controls the vehicle on-board battery (for example, a lithium battery) to provide the target input power for the vehicle air conditioner at 7:50 AM according to the target command (the precooling command), therefor the vehicle air conditioner is controlled to work in a precooling mode, and continues to work at 16° C. for ten minutes, so as to reduce the temperature inside the vehicle to 21° C. Of course, the target input power may be changed, and the preset length of time may also include at least two lengths. For example, for the user A, after the vehicle air conditioner is controlled to work continuously at 16° C. for ten minutes, the temperature inside the vehicle drops to 21° C. At this time, the vehicle on-board controller adjusts the target input power provided by the vehicle on-board battery for the vehicle air conditioner at 8:00 AM according to the target command (the precooling command) to control the vehicle air conditioner works at 21° C. and continues to work for one hour.

If the user A has a cold, the user A may perform the adjustment operation for the target pre-control strategy on the display interface after the target pre-control strategy is pushed to the user A that day, for example, the user A may cancel the target pre-control strategy of the day. If the user A still needs to use the vehicle, but the usage plan has changed, the user A may modify the target time for the target pre-control strategy on the display interface, for example, changing the target time from 7:50 AM to 2:00 PM, and the user A may also reduce the target input power to control the vehicle air conditioner to work at 25° C. to avoid a second cold. The above examples are intended to help those skilled in the art to understand the implementation process, but do not limit the scope of protection of the present disclosure.

In an embodiment, the key data includes the user information, the historical usage data of the vehicle air conditioner, and the weather information. One vehicle may be used by multiple users, therefore the key data may include the user information, which is conducive to analyzing each user's habits of using the vehicle air conditioning, and providing the current user with a target pre-control strategy that better matches a personal behavior habit. The historical usage data of the vehicle air conditioner may fully reflect the user's habits for using the vehicle and the demands for the vehicle air conditioner in different seasons, different time periods, and different weather conditions. The weather information man be combined with the historical usage data of the vehicle air conditioner to fully reflect the user's demands for the air conditioner usage.

In an embodiment, the step of generating the target pre-control strategy according to the key data further includes the following steps: key data sample sets are acquired, the key data sample sets include the user information, the historical usage data of the vehicle air conditioners, and the historical weather information; data in the key data sample sets is input into a preset neural network model to train the preset neural network model; the trained neural network model is used as the control strategy generation model; and the target pre-control strategy is generated according to the current weather information, current logged-in user information, and the control strategy generation model.

The preset neural network model is trained by the key data sample sets, and the control strategy generation model is generated to guide the subsequent target pre-control strategy and the precooling control and the preheating control of the vehicle air conditioner. Moreover, the preset neural network model may be continuously trained according to the new key data obtained from the vehicle on-board controller, so that the generated target pre-control strategy meets the user expectations. In the above training process, a training of the control strategy generation model for a single user may be performed according to the user information. After the above training, the control strategy generation models corresponding to multiple users may be obtained. A mapping relationship between the user information and the control strategy generation models may be established. Then, the terminal may access a database of the server according to the user information of the user currently logged in, and determine the target pre-control strategy that matches the behavior habits of the user according to the mapping relationship between the user information and the control strategy generation models.

In an embodiment, the inputting the data in the key data sample sets into the preset neural network model to train the preset neural network model includes the following steps:
  the user information and the historical weather data during a historical use of the vehicle air conditioner are input into the preset neural network model to obtain a predicted usage data of the vehicle air conditioner, the preset neural network model may be a back propagation (BP) network model; and
  weight parameters of the preset neural network model are updated according to an error between the predicted usage data of the vehicle air conditioner and the corresponding actual historical usage data of the vehicle air conditioner, until the error between the predicted usage data of the vehicle air conditioner and the corresponding actual historical usage data of the vehicle air conditioner is less than a preset threshold.

If the usage data includes data of multiple dimensions, the error can be a vector consisting of the data differences of each dimension. In this case, the error is less than the preset threshold means that the data difference of each dimension is less than the preset threshold.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same concept, the embodiments of the present disclosure further provide a vehicle air conditioner control device for implementing the above-mentioned vehicle air conditioner control method. The solution to the problem provided by the vehicle air conditioner control device is similar to the solution described in the vehicle air conditioner control method, so the limitations in one or more embodiments of the vehicle air conditioner control device provided below can be referred to above for the vehicle air conditioner control method, which are not repeated here.

Figure 5:
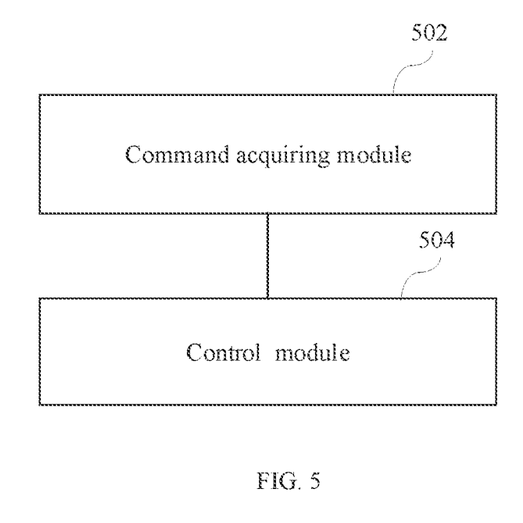
FIG. 5 is a block diagram of a device for controlling a vehicle air conditioner according to an embodiment.

In an embodiment, as shown in FIG. 5, the present disclosure provides a vehicle air conditioner control device, which may be applied to the vehicle on-board controller. The device includes a command acquiring module 502 and a control module 504.

The command acquiring module 502 is configured to acquire the target command sent by the terminal. The target command is generated and sent by the terminal at the target time according to the target pre-control strategy, and the target pre-control strategy is generated according to the key data and confirmed by the user. In some embodiments, the target command includes the precooling command and the preheating command. The precooling command is generated when the vehicle air conditioner is needed to perform precooling, and the preheating command is generated when the vehicle air conditioner is needed to perform preheating.

The control module 504 is configured to control the vehicle on-board battery, according to the target command, to provide the target input power for the vehicle air conditioner within the preset length of time to control the vehicle air conditioner to precool or preheat for the preset length of time from the target time.

Figure 6:
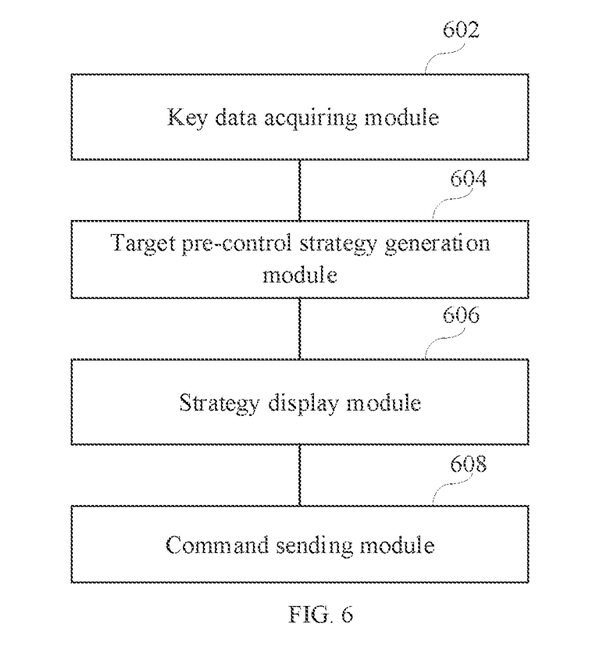
FIG. 6 is a block diagram of a device for controlling a vehicle air conditioner according to another embodiment.

In an embodiment, as shown in FIG. 6, the present disclosure provides a vehicle air conditioner control device, which may be applied to the terminal. The device includes a key data acquiring module 602, a target pre-control strategy generation module 604, a strategy display module 606, and a command sending module 608.

The key data acquiring module 602 is configured to acquire the key data sent by the vehicle on-board controller.

The target pre-control strategy generation module 604 is configured to generate the target pre-control strategy according to the key data.

The strategy display module 606 is configured to display the target pre-control strategy by a display interface of the terminal.

The command sending module 608 is configured to generate the target command, and send the target command to the vehicle on-board controller at the target time according to the target pre-control strategy, in response to the confirmation operation for the target pre-control strategy on the display interface.

The modules in the above vehicle air conditioner control device can be implemented in whole or in part by software, hardware and combinations thereof. The above modules can be embedded in or independent of a processor in a computer device in a form of hardware, or stored in a memory in the computer device in a form of software, so that the processor can call and execute the operations corresponding to the above modules. The vehicle air conditioner control device may further include other modules and units, which may be configured to perform other steps in the above embodiments, and achieve corresponding beneficial effects.

In an embodiment, a vehicle on-board controller is provided. The vehicle on-board controller includes a memory and a processor. A computer program is stored in the memory, and when executing the computer program, the processor implements the above-mentioned method steps in the vehicle on-board controller side.

Figure 7:
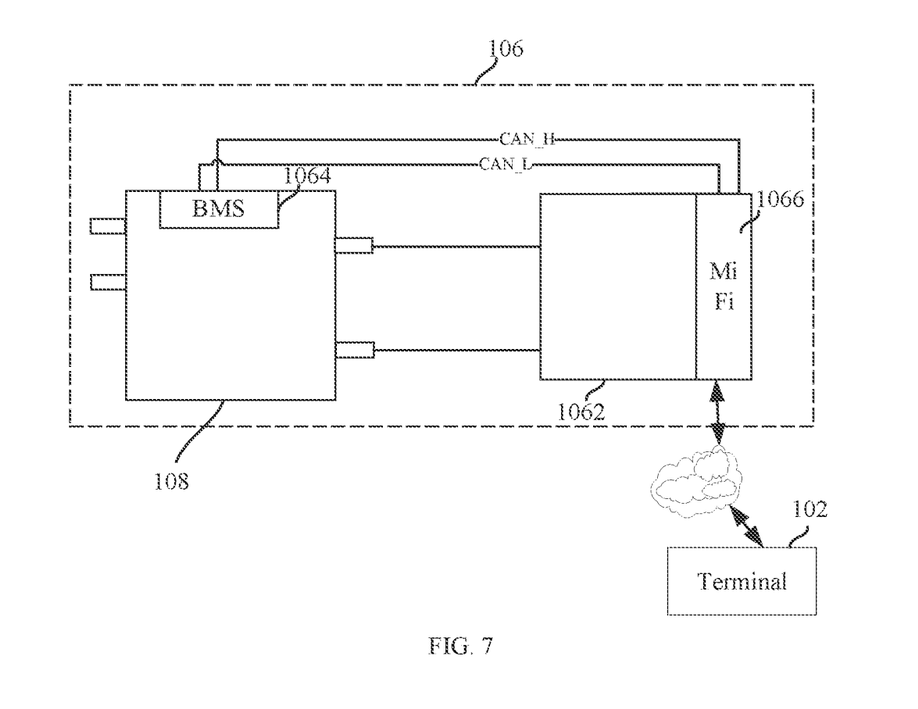
FIG. 7 is a schematic diagram showing a structure of a vehicle on-board controller according to an embodiment.

In one embodiment, as shown in FIG. 7, the vehicle on-board controller includes: a battery management system (BMS) 1064 configured to be connected to a vehicle on-board battery 108; an air conditioner controller 1062 configured to control the vehicle air conditioner; and a communication module 1066 connected to the battery management system 1064 and the air conditioner controller 1062, and is configured to be communication connected to the terminal 102.

The communication module 1066 receives and parses the target command sent by the terminal 102, and sends the target command to the battery management system 1064 and the air conditioner controller 1062 respectively after parsing, so that the battery management system 1064 controls the vehicle on-board battery 108 to provide target input power to the vehicle air conditioner, and the air conditioner controller 1062 controls the vehicle air conditioner to work in the precooling mode or the preheating mode (either, depending on the precooling and pre-heating control command) for a preset length of time.

The communication module 1066 may be a mobile WiFi (MiFi, a portable broadband wireless device). The MiFi may be integrated in the air conditioning controller 1062.

The target command may include the contents of the fields such as a target time, a target working mode, a preset time length, a target input power, and a desired temperature, etc.

In an embodiment, the vehicle on-board battery 108 is a lithium battery.

In an embodiment, the lithium battery may be a 48V fast charging lithium battery. The lithium battery may also be connected to an electric generator, and an end of the electric generator, which is not connected to the lithium battery, is connected to the engine. The battery management system 1064 may control the lithium battery to store the electrical energy output by the electric generator for supplying power to the vehicle air conditioner while the vehicle is running, which is also conducive for the pre-cooling or pre-heating control of the vehicle air conditioner when the vehicle is not running. The battery management system 1064 and the lithium battery may be packaged together.

The modules may be connected by CAN buses or other cables.

Figure 8:
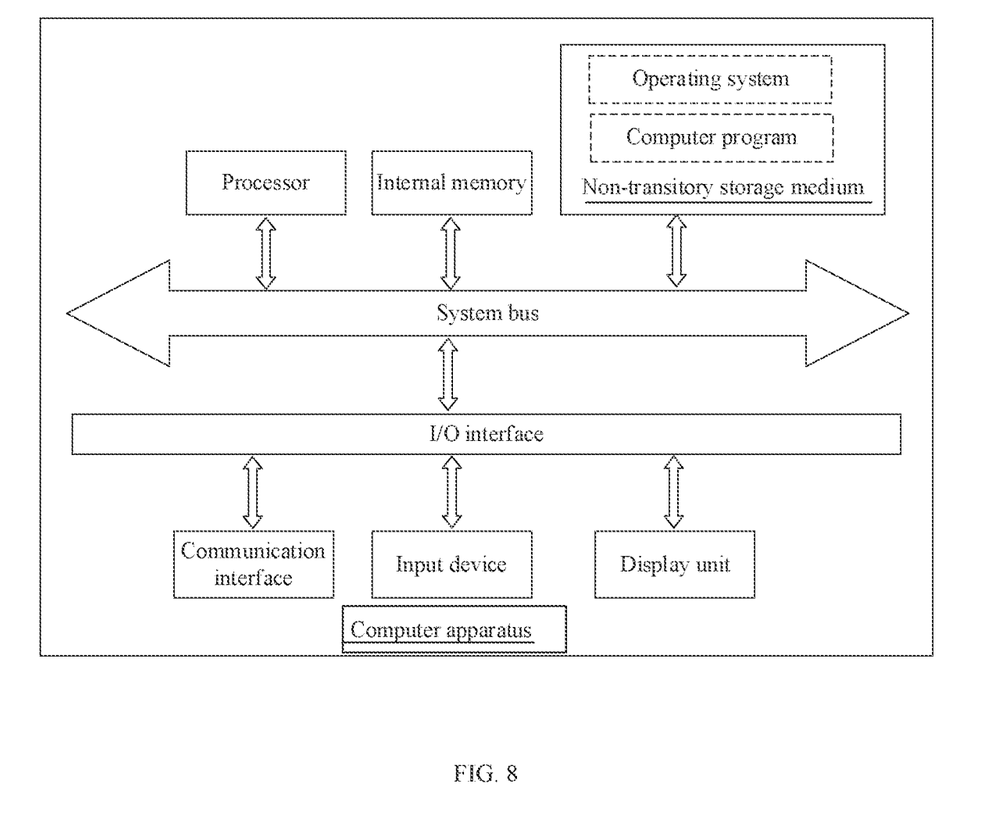
FIG. 8 is a schematic diagram showing an internal structure of a computer device according to an embodiment.

In an embodiment, the present disclosure further provides a computer apparatus, which may be a terminal, an internal structure of the computer apparatus is shown in FIG. 8. The computer apparatus includes a processor, a memory, a communication interface, a display unit, and an input device, which are connected through a system bus. The processor of the computer apparatus is configured to provide computing and control capabilities. The memory of the computer device may include a non-transitory storage medium and an internal memory. The non-transitory storage medium stores an operating system and a computer program. The internal memory provides an environment for the operation of the operating system and the computer program in the non-transitory storage medium. The communication interface of the computer apparatus is configured to be in wired or wireless communication with the external terminals, and the wireless communication may be realized by WIFI, mobile cellular network, Near Field Communication (NFC) or other technologies. The computer program is executed by the processor to implement the vehicle air conditioner control method. The display unit of the computer apparatus may be a liquid crystal display or an electronic ink display. The input device of the computer apparatus may be a touch layer covered on the display screen, or a button, a trackball or touchpads on a housing of the computer apparatus, and may also be an external keyboard, touchpad or mouse, etc.

Those skilled in the art should understand that the structure shown in FIG. 8 is only a block diagram of a part of the structure related to the solution of the present disclosure, and does not constitute a limitation on the computer apparatus to which the solution of the present disclosure is applied. A particular computer apparatus may include more or fewer components, combine certain components, or have a different arrangement of components.

In an embodiment, the present disclosure further provides a computer device including a memory and a processor, a computer program stored in the memory, when the computer program is executed by the processor, the processer implements the above-mentioned vehicle air conditioning control method in the terminal side, and the corresponding beneficial effect is achieved.

In an embodiment, a computer-readable storage medium is further provided. A computer program is stored in the computer-readable storage medium, and when the computer program is executed by a processor, the above-mentioned vehicle air conditioner control method is performed, and corresponding beneficial effects are achieved.

In an embodiment, the present disclosure further provides a computer program product, which includes a computer program. When the computer program is executed by a processor, the vehicle air conditioner control method is performed, and the corresponding beneficial effects are achieved.

It should be noted that the user information (including but not limited to the vehicle information, the terminal information, the user's personal information, etc.) and the data (including but not limited to the data used for analysis, store, display, etc.) involved in the present disclosure are authorized by the user or fully authorized by all parties.

Those skilled in the art can understand that all or part of the processes of the methods of the above embodiments can be implemented by instructing relevant hardware through a computer program, and the computer program can be stored in a non-volatile computer-readable storage medium. When the computer program is executed, it can implement the processes of the aforementioned embodiments of the methods. Any reference to a memory, a database or other media used in the embodiments provided in the present disclosure may include at least one of a non-volatile memory and a volatile memory. The Non-volatile memory may include a Read-Only Memory (ROM), a magnetic tape, a floppy disk, a flash memory, an optical memory, a high-density embedded non-volatile memory, a resistive memory (ReRAM), a Magnetoresistive Random Access Memory (MRAM), a Ferroelectric Random Access Memory (FRAM), a Phase Change Memory (PCM), or a graphene memory, etc. The volatile memory may include a Random Access Memory (RAM) or an external cache memory, and the like. By way of illustration and not limitation, the RAM may be in various forms, such as a Static Random Access Memory (SRAM) or a Dynamic Random Access Memory (DRAM). The database involved in the embodiments provided in the present disclosure may include at least one of a relational database or a non-relational database. The non-relational database may include a blockchain-based distributed database, etc., but is not limited thereto. The processors involved in the embodiments provided in present disclosure may be general-purpose processors, central processing units, graphics processors, digital signal processors, programmable logic devices, data processing logic devices based on quantum computing, etc., and is not limited to this.

The technical features in the above embodiments may be randomly combined. In order to make the description concise, not all possible combinations of the technical features in the above embodiments are described. However, all the combinations of the technical features are to be considered as falling within the scope described in this specification provided that they do not conflict with each other.

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. A method for controlling vehicle air conditioner applied in a vehicle on-board controller, comprising:
    sending key data to a terminal, the key data being configured for the terminal to generate a target pre-control strategy by using a preset neural network model;
    acquiring a target command sent by the terminal, the target command being generated and sent by the terminal at a target time according to the target pre-control strategy, and the target pre-control strategy being generated by inputting the key data into the present neutral network model, and the target pre-control strategy is confirmed by the user; and
    controlling a vehicle on-board battery, according to the target command, to provide a target input power for a vehicle air conditioner within a preset length of time to control the vehicle air conditioner to precool or preheat for the preset length of time from the target time, wherein electrical energy of the vehicle on-board battery is obtained by storing electrical energy output by an electric generator while the vehicle is running.

2. The method according to claim 1, wherein the key data comprises usage data of the vehicle air conditioner, the method further comprises:
    acquiring and sending the usage data of the vehicle air conditioner to the terminal to enable the terminal to generate the target pre-control strategy according to the usage data of the vehicle air conditioner.

3. The method according to claim 1, wherein the target command comprises a precooling command and a preheating command, the precooling command is generated when the vehicle air conditioner is needed to perform precooling, and the preheating command is generated when the vehicle air conditioner is needed to perform preheating.

4. A method for controlling vehicle air conditioner applied in a terminal, the method comprising:
    acquiring key data sent by a vehicle on-board controller;
    generating a target pre-control strategy according to the key data by using a preset neural network model;
    displaying the target pre-control strategy by a display interface of the terminal; and
    generating a target command and sending the target command to the vehicle on-board controller at a target time according to the target pre-control strategy, in response to a confirmation operation for the target pre-control strategy on the display interface, such that the vehicle on-board controller controls a vehicle on-board batter, according to the target command, to provide a target input power for a vehicle air conditioner within a preset length of time to control the vehicle air conditioner to precool or preheat for the preset length of time from the target time, wherein electrical energy of the vehicle on-board battery is obtained by storing electrical energy output by an electric generator while the vehicle is running.

5. The method according to claim 4, after the displaying the target pre-control strategy by a display interface of the terminal, further comprising:
    generating the target command and sending the target command to the vehicle on-board controller at the target time according to an adjusted target pre-control strategy, in response to an adjustment operation for the target pre-control strategy on the display interface.

6. The method according to claim 5, wherein the key data comprises:
    user information, historical usage data of a vehicle air conditioner, and weather information.

7. The method according to claim 5, wherein the generating the target pre-control strategy according to the key data comprises:
    acquiring key data sample sets, the key data sample sets comprising user information, historical usage data of a vehicle air conditioners, and historical weather information;
    inputting data in the key data sample sets into a preset neural network model to train the preset neural network model;
    using the neural network model as a control strategy generation model; and
    generating the target pre-control strategy according to current weather information, current logged-in user information, and the control strategy generation model.

8. The method according to claim 7, wherein the inputting data in the key data sample sets into a preset neural network model to train the preset neural network model comprises:
    inputting the user information and the historical weather data during a historical use of the vehicle air conditioner into the preset neural network model to obtain a predicted usage data of the vehicle air conditioner; and
    updating weight parameters of the preset neural network model according to an error between the predicted usage data of the vehicle air conditioner and a corresponding actual historical usage data of the vehicle air conditioner, until the error between the predicted usage data of the vehicle air conditioner and the corresponding actual historical usage data of the vehicle air conditioner is less than a preset threshold.

9. The method according to claim 4, wherein the target command comprises a precooling command and a preheating command, the precooling command is generated when the vehicle air conditioner is needed to perform precooling, and the preheating command is generated when the vehicle air conditioner is needed to perform preheating.

10. A vehicle on-board controller, comprising a memory and a processor, wherein a computer program is stored in the memory, and when the computer program is executed by the processor, the vehicle on-board controller performs the following steps:
- sending key data to a terminal, the key data being configured for the terminal to generate a target pre-control strategy by using a preset neural network model;
- acquiring a target command sent by the terminal, the target command being generated and sent by the terminal at a target time according to the target pre-control strategy, and the target pre-control strategy being generated by inputting the key data into the preset neural network model, and the target pre-control strategy is confirmed by the user; and
- controlling a vehicle on-board battery, according to the target command, to provide a target input power for a vehicle air conditioner within a preset length of time to control the vehicle air conditioner to precool or preheat for the preset length of time from the target time, wherein electrical energy of the vehicle on-board battery is obtained by storing electrical energy output by an electric generator while the vehicle is running.

11. The vehicle on-board controller according to claim 10, wherein the target command comprises a precooling command and a preheating command, the precooling command is generated when the vehicle air conditioner is needed to perform precooling, and the preheating command is generated when the vehicle air conditioner is needed to perform preheating.

* * * * *